No. 756,704. PATENTED APR. 5, 1904.
J. PRADE.
ICE CREAM FREEZER.
APPLICATION FILED JUNE 29, 1903.
NO MODEL.

WITNESSES:
F. C. Gibson.
Jos. A. Ryan

INVENTOR
Julien Prade.
BY Munn & Co.
ATTORNEY

No. 756,704. Patented April 5, 1904.

UNITED STATES PATENT OFFICE.

JULIEN PRADE, OF WACO, TEXAS.

ICE-CREAM FREEZER.

SPECIFICATION forming part of Letters Patent No. 756,704, dated April 5, 1904.

Application filed June 29, 1903. Serial No. 163,498. (No model.)

*To all whom it may concern:*

Be it known that I, JULIEN PRADE, residing at Waco, in the county of McLennan and State of Texas, have invented a new and Improved Ice-Cream Freezer, of which the following is a specification.

This invention relates to improvements in that type of ice-cream freezers designed for the utilization of brine, anhydrous ammonia, and other like refrigerant; and it primarily seeks to provide a freezing apparatus of the character stated of a simple and economical construction capable of being easily manipulated and in which the operation of freezing the cream may be continuous, and in its generic nature it comprehends a peculiar construction of a freezing-cylinder and means for feeding the refrigerant and the cream thereto and in which the several parts are so designed and coöperate whereby power is saved by scraping and stirring and discharging the cream before too much of the same accumulates within the freezing-cylinder.

In its more subordinate features my invention embodies a peculiar combination of parts, all of which will hereinafter be fully explained, and specifically pointed out in the appended claims, reference being had to the accompanying drawings, in which—

Figure 1:
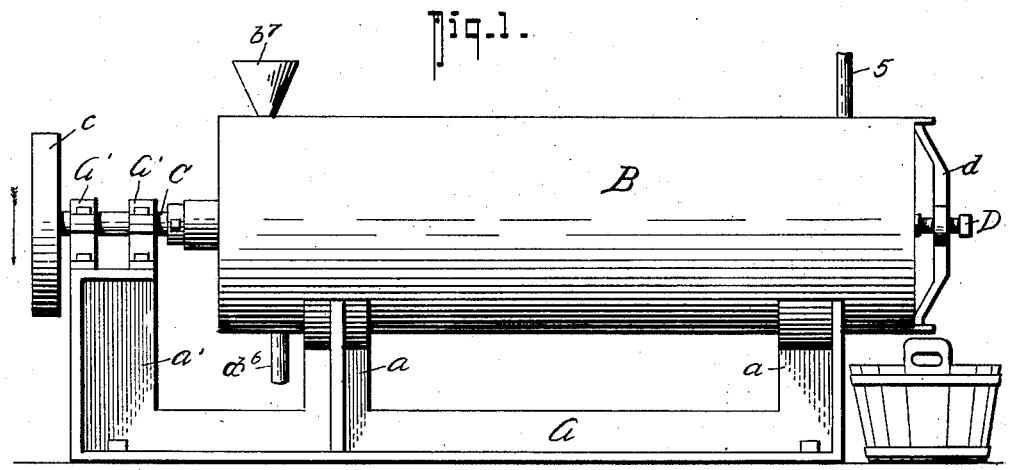
Figure 2:
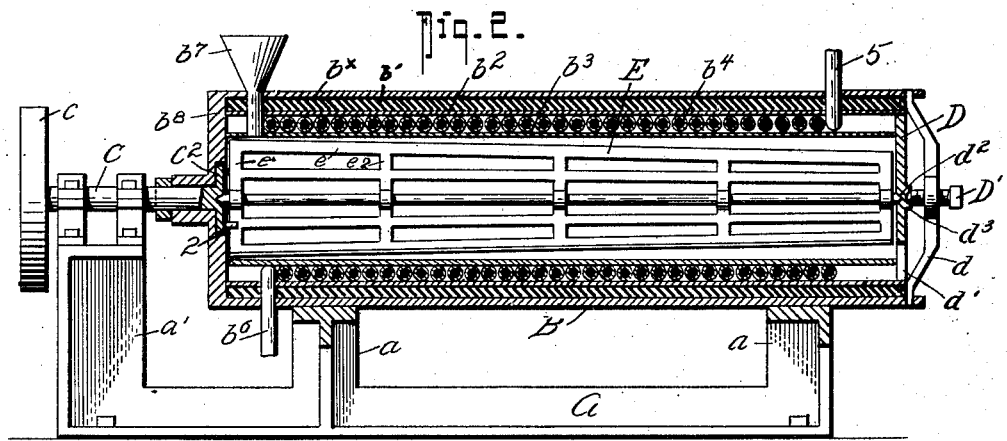
Figure 4:
Figures 3, 5, 6, 7:
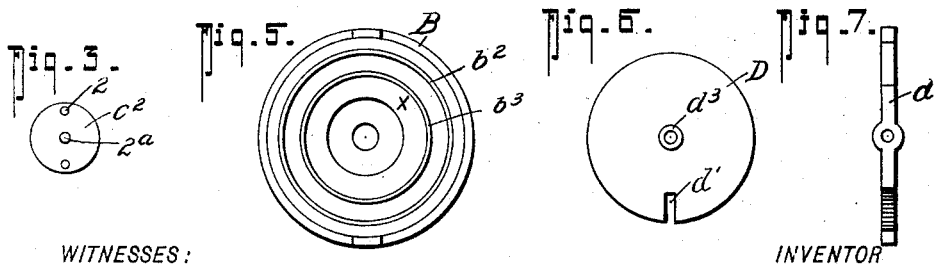

Figure 1 is a side elevation of my ice-cream freezer. Fig. 2 is a longitudinal section thereof. Fig. 3 is a detail face view of the bearing and power-transmitting disk hereinafter referred to. Fig. 4 is an edge view of the combined stirring and feeding device. Fig. 5 is a detail cross-section of the cylinder. Fig. 6 is an end view thereof, and Fig. 7 is an edge view of the crowfoot or spider-frame hereinafter described.

In its practical construction my improved ice-cream freezer includes a supporting-base A, provided with vertically-extended portions $a\ a$, having concave beds to receive and support the cylinder B, which is stationarily held upon said base members $a\ a$, and at one end the said base A has a further extension $a'$, upon which is mounted pillow-blocks $A'\ A'$ to receive the actuating-shaft C, provided with a crank-wheel $c$, which in operation is caused to turn in the direction indicated by the arrow on Fig. 1.

The cylinder B comprises an outer cylindrical shell $b^\times$ and two cylindrical shells $b^2\ b^3$, between which the coils $b^4$ are located and through which the brine, ammonia, or other freezing fluid or gas which in my construction is fed through the inlet 5, located at the discharge end of the cylinder, and which has its exit at $b^6$ located at the cream-receiving end of the cylinder, such arrangement of feed of the cream and the refrigerant being provided to keep the cylinder coldest at the point where the cream discharges, and thereby prevent the said cream from losing its congealed state at the point of its discharge. The cream is fed through a funnel $b^7$, which projects down through the several shells $b^2$, $b^3$, and $b^\times$ into the freezing-space, (indicated by $x$ on Fig. 5.)

$b'$ indicates an insulating substance which is held within the outer cylinder $b^\times$ and surrounds the inner cylinders $b^2$ and $b^3$ and which may be of charcoal or any other suitable substance. At the cream-inlet end the cylinder is closed by solid cap $b^8$, which is centrally apertured and provided with an axial boss to receive the inner end of the drive-shaft C, and upon the inner face the said cap $b^8$ has an annular socket adapted to receive the disk $C^2$, (see Fig. 3,) which is integrally or otherwise fixedly connected with the shaft C and is provided at diametrically opposite points with inwardly-projecting fingers 2 and a central V-shaped socket $2^a$, the purpose of which will presently appear. The opposite or discharge end of the cylinder is closed by the cap D, provided with a V-shaped axial socket $d^2$ on its inner face and a hub $d^3$ on its outer face provided with a V-shaped bearing to receive the clamp-screw $D'$, that engages the crowfoot or spider-clamp $d$, the opposite ends of which terminate in fingers adapted to engage with hook portions $b$, disposed at diametrically opposite sides of the cylinder $b^\times$, as shown.

E designates a stirring-frame which is at the receiving end of the machine and is substantially of the diameter of the cream-space, and the said frame E extends from the entrant end of the said space to the discharge end of the machine, and it consists of a series of longitudinally-extended scraper-ribs $e$, braced by the cross-bars $e'$ at the ends and intermittent crossbraces $e^2$, as shown, and to effect a desired continuous feed of the frozen cream toward the discharge end the said stirring-frame E is slightly twisted or bent into a spiral form, as indicated in Fig. 4.

The ends $e'$ $e'$ on the frame E have cone-shaped bearing-studs to engage the sockets in the end cap D and the disk $c^2$, as shown.

The cap D at the discharge end has a radial slot $d'$, which extends up sufficiently over the cream-space $x$ to provide a discharge for the frozen cream as it is fed to the discharge end by the stirring-frame E.

In operation the fluid or gaseous refrigerant is caused to enter the inlet 5 and the circulating-coils $b^4$ to absorb the heat from the contents or cream within the freezing-space $x$, and the said refrigerant as it continues its desired action in passing through the coils $b^4$ discharges through the outlet $b^6$, and in passing it is caused to return to the inlet 5 by any suitable means.

The pulley $c$, which is operated in any manner, drives the frame E, which is so twisted to gradually work or convey the frozen cream toward the cap D, and the rotation of the said frame E is effected by reason of the projections 2 on the disk $C^2$ projecting over and straddling the cross-bar $c'$ on the inner end of the said frame E. The frame E, while acting as a means for feeding the frozen cream to the discharge, also serves to scrape the said cream off the inner face of the inner cylinder $b^2$.

From the foregoing, taken in connection with the accompanying drawings, it is believed the complete construction, operation, and advantages of my invention will be readily apparent.

It will be observed the construction thereof is such that the cream can be continuously fed proportionate to the freezing qualities thereof and the discharge of the frozen cream through the slot $d'$ in the cap-plate D by reason of feeding the refrigerant and causing it to flow in the direction opposite to the flow of the frozen cream a maximum absorption operation is obtained from the given quantity of the refrigerant fluid or gas. Furthermore, the coöperative arrangement of the parts is such that the same can be quickly dissembled to permit of cleaning the apparatus.

Having thus described my invention, what I claim, and desire to secure by Letters Patent, is—

1. An ice-cream freezer of the character described, comprising a base, a cylinder fixedly supported thereon in a horizontal plane, said cylinder having a fixedly-held head at one end and a detachable head at the other end, the latter having a radial slot forming a cream-discharge at its bottom, a freezing-chamber within the cylinder, a series of refrigerant circulating-coils surrounding said chamber, an inlet for the said coils at the discharge end of the cylinder and a discharge therefor at the entrant end of the cylinder, an insulating-jacket in the cylinder surrounding the refrigerant circulating-coils, a stirrer-frame extending lengthwise within the freezing-chamber and detachably mounted therein, a drive-shaft coupled with said frame for rotating it, and a cream-inlet at the entrant end of the cylinder.

2. An ice-cream freezer of the character described, the combination with a supporting-frame; of a cylinder fixedly mounted thereon in a horizontal plane, said cylinder having a permanent head at the entrant end centrally apertured and provided with an annular socket on the inside surrounding said aperture, a detachable head for the discharge end, means for clamping said head to the cylinder, said head having a radial slot forming a cream-discharge in line with the freezing-space within the cylinder, an insulating-jacket inside the cylinder, an annular shell inside of the said jacket, a refrigerant circulating-coil within the said shell having a suitable inlet and outlet, a shaft mounted in the supporting-frame and projected through the aperture in the fixed cylinder-head and having a fixedly-connected disk adapted to seat in the annular socket in the said head, said disk having a central bearing-socket and inwardly-projecting fingers, a detachably-held plate having centrally-bearing sockets on its inner face; clamp devices for securing said head-plate, a stirrer-frame mounted in the freezing-chamber of the cylinder, said frame comprising longitudinally-extending scraping-blades and end and intermediate cross-bars joining the said blades, the said longitudinal blades being spiral-twisted toward the discharge end of the cylinder, the end bars having studs to engage the aforesaid sockets, one of said bars being engaged by the projecting fingers on the shaft-carried disk, all being arranged substantially as and for the purposes described.

3. The improved freezer herein described, comprising in combination with the supporting-base having the upright legs provided with concave beds to receive a cylinder, and an end extension provided with an upright leg having bearings for a drive-shaft, the drive-shaft journaled in said bearings, the cylinder mounted in the concave beds of the frame-legs, and having at one end a fixed head provided with an opening for the drive-shaft, said cylinder having an outer and inner shell, the refrigerating-coil between said shells, the insulating-chamber surrounding the outer shell, the stirrer within the inner shell and engaged at one end with the drive-shaft, the removable head having a bearing for the other ends of the stirrer, and clamping devices for securing said removable head, substantially as set forth.

JULIEN PRADE.

Witnesses:
F. M. HARDING,
E. M. EWING.